United States Patent
Giannuzzi et al.

[19]

[11] Patent Number: 5,857,817
[45] Date of Patent: *Jan. 12, 1999

[54] CENTERING SLEEVE AND OVERFLOW MEMBER ASSEMBLY FOR MASONRY INSTALLATIONS

[75] Inventors: Louis N. Giannuzzi, Stamford, Conn.; Anthony C. Giannuzzi, 28 Doral Farm Rd., Stamford, Conn. 06902

[73] Assignee: Anthony C. Giannuzzi, Stamford, Conn.

[*] Notice: The term of this patent shall not extend beyond the expiration date of Pat. No. 5,562,377.

[21] Appl. No.: 752,246

[22] Filed: Nov. 19, 1996

Related U.S. Application Data

[63] Continuation-in-part of Ser. No. 526,203, Sep. 11, 1995, which is a continuation-in-part of Ser. No. 431,507, Apr. 27, 1995, Pat. No. 5,562,377, and Ser. No. 720,921, Oct. 7, 1996.

[51] Int. Cl.$^6$ .................................................. F16B 13/00
[52] U.S. Cl. ............................... 411/82; 52/698; 52/699; 52/704; 405/259.6; 405/259.5; 411/930; 411/258
[58] Field of Search ............................. 52/698, 699, 704, 52/705, 707, 745.21, 98; 405/259.6, 259.5; 411/82, 258, 930, 14

[56] References Cited

U.S. PATENT DOCUMENTS

| | | | |
|---|---|---|---|
| 4,642,964 | 2/1987 | Kellison | 52/699 |
| 4,836,729 | 6/1989 | Bisping et al. | 411/82 |
| 4,840,524 | 6/1989 | Bisping et al. | 411/82 |
| 5,033,910 | 7/1991 | Wright | 405/261 |
| 5,098,227 | 3/1992 | Wright | 405/259.6 |
| 5,263,804 | 11/1993 | Ernst et al. | 411/82 |
| 5,435,679 | 7/1995 | Barry | 411/339 |
| 5,562,377 | 10/1996 | Giannuzzi et al. | 411/82 |
| 5,628,161 | 5/1997 | Giannuzzi et al. | 52/698 |

Primary Examiner—Robert Canfield
Attorney, Agent, or Firm—Michael Ebert

[57] ABSTRACT

A centering sleeve and overflow member assembly adapted to facilitate installation of a bolt having a head and a shank extending therefrom in a hole drilled in masonry having a diameter greater than that of the shank to fasten a fixture to the masonry. The fixture has a mounting hole in alignment with the masonry hole in which is deposited a charge of a flowable uncured bonding agent. The overflow member which rests on the fixture has an opening therein in registration with the mounting hole and the sleeve which fits in the mounting hole telescopes into the upper end of the masonry hole. The sleeve is provided with centering means which when the shank is inserted through the sleeve into the masonry hole and the bolt head then lies adjacent the fixture, then acts to maintain the shank coaxial with the sleeve and with the bank of the masonry hole below the sleeve to define an inner passage between the shank and the sleeve and an annular space between the shank and the bank. When the shank enters the masonry hole and plunges into the charge, the flowable agent is caused to rise in the annular space and through the inner passage in the sleeve to overflow onto the member placed on the fixture. When the agent cures and solidifies, it then chemically anchors the shank in the masonry hole, the solidified agent collected on the overflow member being then discarded to provide a clean fixture surface.

15 Claims, 2 Drawing Sheets

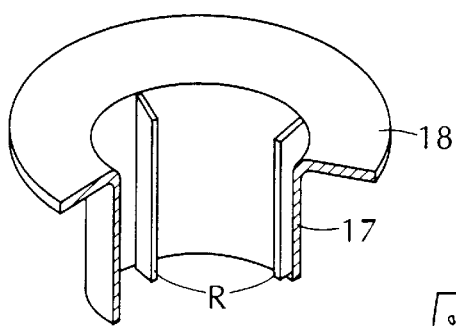
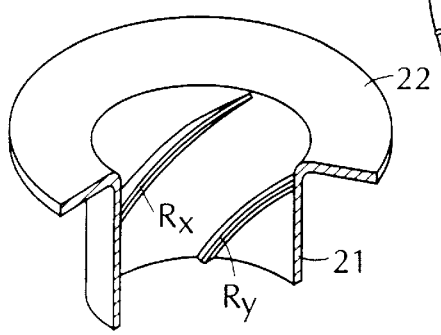
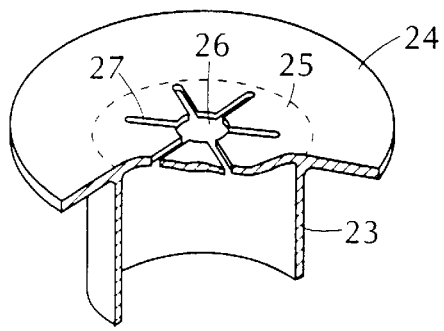
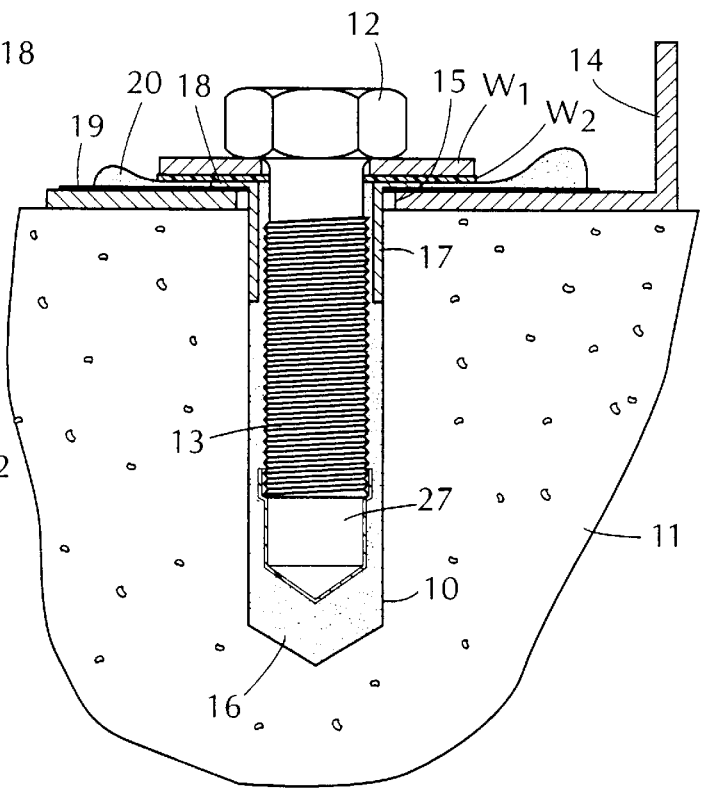

CENTERING SLEEVE AND OVERFLOW MEMBER ASSEMBLY FOR MASONRY INSTALLATIONS

RELATED APPLICATIONS

This application is a continuation-in-part (C-I-P) of the Giannuzzi et al. Ser. No. 08/526,203, filed Sep. 11, 1995 entitled CENTERING SLEEVE AND OVERFLOW RING ASSEMBLY which in turn is a C-I-P of the Giannuzzi et al. application Ser. No. 08/431,507, filed Apr. 27, 1995 entitled ANCHOR SLEEVE AND BOLT ASSEMBLY (now U.S. Pat. No. 5,562,377). This application is also a C-I-P of the Giannuzzi et al. application Ser. No. 08/720,921 filed Oct. 7, 1996 entitled CHEMICAL ANCHOR BOLT AND CAP ASSEMBLY. The entire disclosures of the above-identified applications are incorporated herein by reference.

BACKGROUND OF INVENTION

1. Field of Invention

This invention relates generally to chemically-bonded anchor bolts for fastening fixtures and other objects to masonry, and more particularly to a centering sleeve and overflow member assembly to facilitate the installation of a bolt in a hole drilled in masonry having deposited therein a flowable bonding agent which when cured chemically anchors the bolt in place.

2. Status of Prior Art

The term masonry refers to a construction of stone or similar materials such as concrete and brick. The walls, ceiling and floors of many edifices are formed of masonry. In order, therefore, to fasten fixtures, machines, structural members or other objects to masonry, a masonry anchor is required for this purpose.

In the case of concrete or any other form of masonry, one cannot drill a hole therein and then tap this hole so that it can receive an anchor bolt, a threaded stud or other threaded mounting means to secure a fixture or other object to the face of the masonry. The nature of masonry is such that a cutting action to cut deep female threading into the bank of the hole cannot be effected, for this action will disintegrate the masonry material.

In order, therefore, to anchor a threaded rod or stud in a hole drilled in masonry, the present practice is to use a curable chemical bonding agent for this purpose. A typical agent of this type has two flowable components, one being a resinous bonding agent, the other a hardener therefor. The resins may be phenol, vinyl, ester or epoxy based. The two components, when stored, must be separated to prevent interaction therebetween. Many bonding agents currently available have an accelerated curing time and set within 10 to 30 minutes to afford substantial holding power. In practice, a charge of the resinous component and sufficient hardener intermixed therewith are deposited in the hole, and a threaded mounting stud is then inserted in the hole.

To this end use may be made of a dispenser gun to inject a charge of the flowable bonding agent into the drilled hole. Or the charge may be contained in a capsule that is deposited in the drilled hole and is ruptured to release the bonding agent when the stud is inserted in the hole.

After the resinous interfacial layer between the stud and the bank of the hole cures and rigidifies, it then bonds itself both to the stud and to the masonry whereby the stud is permanently anchored in the hole. In order now to secure a fixture to the masonry face, the fixture which has a mounting hole therein is placed over and onto the projecting stud and locked thereto by a washer and nut.

Of prior art background interest is the Kellison U.S. Pat. No. 4,642,964 which discloses a fastening system for chemically-bonding an anchor bolt in a hole drilled in masonry.

One problem faced by the installer of an anchor stud or bolt into a hole drilled in masonry arises from the fact that when the hole has deposited therein a charge of an uncured bonding agent in which is inserted the anchor to be installed, the installer cannot then see into the hole. In order, therefore, to be sure that the charge of bonding agent he has deposited is adequate for its intended purpose, the installer depends on an overflow of the agent from the hole all around the anchor stud. This overflow indicates to the installer that the uncured bonding agent in the hole is properly spread about the inserted anchor. However, while this overflow of uncured bonding agent is necessary to a proper anchor installation procedure, it also creates a multitude of problems, as will now be explained.

One problem encountered by an installer arises from the overflow of the uncured bonding agent onto the region of the masonry surrounding the projecting stud. While such overflow is useful, for it serves to indicate that the space surrounding the stud in the hole is filled with the uncured agent, this overflow onto the masonry surface cannot be permitted to cure and harden. Should this happen, a protuberance would be created on the masonry that would interfere with the proper placement of the fixture or other object onto the masonry.

Moreover, no matter how carefully the installer wipes off the uncured overflow, there is usually a residue left on the masonry surface. And when a fixture is then placed on this surface so that it can be fastened to the masonry, the residue at the interface of the fixture (or other object) will then bond the fixture to the masonry. This is highly undesirable, for should it be necessary to later remove the fixture from the masonry, it may then be very difficult to do so.

The stud inserted in the drilled hole has a diameter necessarily smaller than that of the drilled hole in order to create an annular space between the stud and the bank of the hole to accommodate the bonding agent. This gives rise to another serious problem, for if the inserted stud is not held upright by the uncured agent it tends to lean against the hole. As a consequence, the anchored stud projecting from the masonry will not be perpendicular to the surface of the masonry, and will not be properly aligned with the mounting hole in the fixture to be fastened to the masonry.

Since the diameter of the fixture mounting hole substantially matches that of the stud, a tilted stud may make it impossible to fasten the fixture to the masonry. In a typical installation, the fixture has at least four mounting holes, and these dictate a like number of anchor studs. Should any one of these studs be inclined to a degree where it will not pass through the corresponding mounting hole in the fixture, one cannot then complete the installation.

When the stud is to be anchored in overhead masonry so that the hole drilled therein has a vertical axis, or is to be anchored in vertical masonry so that the hole drilled therein has a horizontal axis, then still another problem is encountered. Now one is faced with leakage of the flowable bonding agent deposited in the hole as a result of gravity flow from the open end of the drilled hole.

Though the uncured agent is usually quite viscous and slow to leak out of the hole, a gradual leakage as a result of gravity flow will diminish the amount of agent in the annular space between the stud and the bank of the hole, and may result in inadequate anchoring of the stud in the drilled hole.

This may have serious consequences, especially in an overhead masonry installation to which a heavy object is fastened.

As evidenced by the Sawaide U.S. Pat. No. 5,049,015, it is known to fit a sleeve into the upper end of a hold bored in masonry in order to center the study inserted through the sleeve into the hole which contains a charge of an uncured chemical bonding agent. The sleeve functions to maintain the stud upright while the agent undergoes curing. However, because the inner wall of the sleeve is in direct contact with the inserted stud this blocks any overflow of the bonding agent out of the hole. This is undesireable for as previously noted, such overflow is a useful indicator that the amount of agent in the hole is adequate to anchor the stud therein.

Also disclosing a centering sleeve fitted into the upper end of a masonry hole is the Fisher U.S. Pat. No. 4,211,049. The Fischer sleeve effectively closes the hole so that there is no outflow of bonding material from the hole even when the hole is drilled in a ceiling or vertical wall.

An installation made in a hole drilled in overhead or vertical masonry presents a special problem, for in both cases there is a possible loss of the bonding agent deposited in the hole as a result of gravity flow. When the stud is inserted in the drilled hole and plunged into the deposit of the flowable bonding agent, an overflow out of the hole is then desirable, for this is indicative of an adequate deposit to anchor the stud. To this end there must be a flow passage between the stud and the wall of the centering sleeve fitted into the hole.

However, after overflow takes place, the same flow passage will permit a viscous bonding agent to gradually leak out of the hole by reason of gravity flow and thereby diminish the amount of agent available to chemically anchor the stud in the hole. In the Giannuzzi et al. application Ser. No. 08/526,203 CENTERING SLEEVE AND OVERFLOW RING ASSEMBLY, there is disclosed an arrangement adapted to facilitate proper installation in a hole drilled in masonry of a stud for fastening a fixture or other object to the masonry. Deposited in the masonry hole is a charge of flowable bonding agent which when cured then anchors in place the stud inserted in the hole. The ring formed of a flat, tearable material, is seated on the masonry in registration with the hole. The sleeve which is snugly nested in the upper end of the hole includes inwardly-directed centering means that engages the stud inserted in the hole to maintain the stud centered therein while providing a flow passage between the stud and the sleeve.

When the inserted stud plunges into the charge of bonding agent, the agent then rises in the hole and passes through the flow passage in the sleeve to overflow onto the ring. After the overflow accumulated on the ring cures and hardens, it is then discarded by tearing off the ring leaving a clean masonry surface.

Of prior art interest in connection with this centering sleeve and overflow ring assembly, in addition to the above-identified Kellison patent, are the patents to: Ernst et al. U.S. Pat. No. 5,263,804, Wright U.S. Pat. No. 5,098,227, Shrader et al. U.S. Pat. No. 5,397,202, Bisping et al. U.S. Pat. No. 4,836,729, Barry U.S. Pat. No. 5,435,679 and Wright U.S. Pat. No. 5,033,910.

In many installations the preferable practice is to fasten a fixture to masonry by means of a bolt rather than a stud. In a stud installation, the stud chemically anchored in a masonry hole projects above the masonry hole, making it necessary to raise the fixture to be fastened so that its mounting holes are in line with the projecting studs. The fixture is then lowered to rest on the masonry surface, after which nuts are turned onto the studs to tighten the fastening. Hence in a stud installation, the studs must be chemically anchored in the masonry holes before the fixture is put in place on the masonry.

In a chemical bolt installation, the fixture to be fastened is placed at a desired site on the masonry, and holes are then drilled in the masonry through the mounting holes in the fixture. The bolts are inserted through the mounting holes into the drilled masonry holes, the heads of the bolts then engaging the fixture. Hence in a bolt installation, the shanks of the bolts are chemically anchored in the drilled masonry holes after the fixture is put in place on the masonry.

In a stud installation, as disclosed in the Giannuzzi et al. application CENTERING SLEEVE AND OVERFLOW RING ASSEMBLY, when a stud is inserted into the masonry hole and plunges into the flowable bonding agent deposited in the masonry hole, the resultant overflow onto the surface of the masonry, the overflow ring is seated on the masonry surface serving to collect this overflow.

But in a bolt installation, the flowable bonding agent passes out of the masonry hole through the mounting hole in the fixture resting on the masonry and therefore overflows onto the surface of the fixture. It if therefore necessary to provide a centering sleeve and overflow member assembly appropriate to a bolt installation.

SUMMARY OF INVENTION

In view of the foregoing, the main object of this invention is to provide a centering sleeve and overflow member assembly adapted to facilitate the proper installation in a hole drilled in masonry of a bolt for fastening a fixture or other object having a mounting hole to the masonry, the masonry hole having deposited therein a flowable bonding agent that when cured, then chemically anchors the bolt.

More particularly, an object of this invention is to provide an assembly of the above type in which a removable overflow member is seated on the fixture resting on the masonry, the member having an opening in line with the mounting hole of the fixture whereby the flowable bonding agent passes from the masonry hole through the mounting hole to overflow onto the member.

Also an object of the invention is to provide an assembly whose sleeve fits into the mounting hole in the fixture to telescope into the upper end of the masonry hole, thereby shielding the interface between the fixture and the masonry so that no bonding agent can seep into the interface.

Yet another object of the invention is to provide an assembly whose sleeve is provided with centering means to maintain the shank of the bolt inserted in the sleeve coaxial with the sleeve, and with the bank of the masonry hole below the sleeve thereby defining an inner passage between the shank and the sleeve and an annular space between the shank and the bank of the masonry hole to permit the bonding agent to flow therethrough.

A significant feature of the invention resides in an assembly whose sleeve includes centering means which retard gravity flow and leakage of the flowable bonding agent from a hole drilled in overhead or vertical masonry.

Briefly stated, these objects are attainable by a centering sleeve and overflow member assembly adapted to facilitate installation of a bolt having a head and a shank extending therefrom in a hole drilled in masonry having a diameter greater than that of the shank to fasten a fixture to the masonry. The fixture has a mounting hole in alignment with the masonry hole in which is deposited a charge of a flowable uncured bonding agent. The overflow member which rests on the fixture has an opening therein in registration with the mounting hole and the sleeve which fits in the mounting hole telescopes into the upper end of the masonry hole.

The sleeve is provided with centering means which when the shank is inserted through the sleeve into the masonry hole and the bolt head then lies adjacent the fixture, acts to maintain the shank coaxial with the sleeve and with the bank of the masonry hole below the sleeve to define an inner passage between the shank and the sleeve and an annular space between the shank and the bank.

When the shank enters the masonry hole and plunges into the charge, the flowable agent is caused to rise in the annular space and through the inner passage in the sleeve to overflow onto the member placed on the fixture. When the agent cures and solidifies, it then chemically anchors the shank in the masonry hole. The solidified agent collected on the overflow member is then discarded to provide a clean fixture surface.

BRIEF DESCRIPTION OF DRAWING

For a better understanding of the invention, as well as other objects and further features thereof, reference is made to the following detailed description to be read in conjunction with the accompanying drawing, wherein:

FIG. 4 is a perspective view of the sleeve included in the assembly which is cut away to expose the centering ribs;

FIG. 5 is a perspective view of another embodiment of the sleeve;

FIG. 6 is a perspective view of still another embodiment the sleeve; and

FIG. 7 illustrates an assembly in accordance with the invention associated with a bolt having a cap, coupled thereto to facilitate tightening of the fastening.

DETAILED DESCRIPTION OF INVENTION
The Assembly

Figure 1:
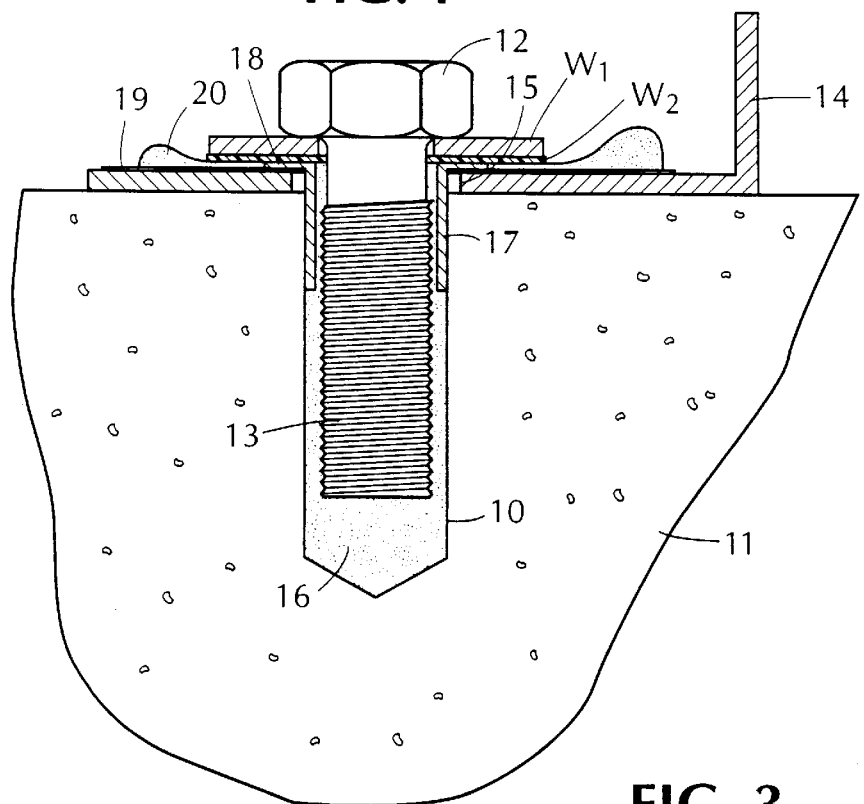
FIG. 1 is a sectional view of a centering sleeve and overflow member assembly in accordance with the invention associated with a bolt installed in a hole drilled in masonry.
Figure 3:
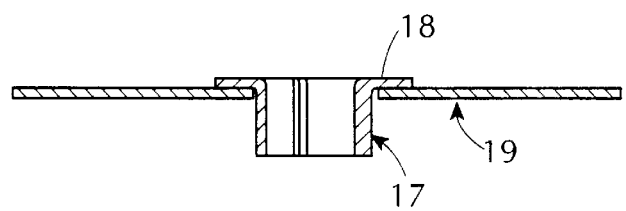
FIG. 3 is a sectional view of the assembly.
Figure 2:
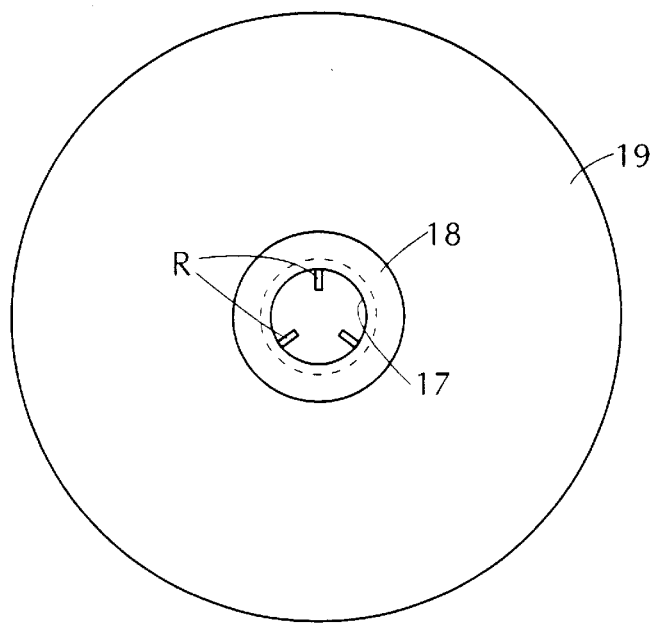
FIG. 2 is a plan view of the assembly.

Referring now to FIGS. 1 to 3, shown therein is a centering sleeve and overflow member assembly in accordance with the invention adapted to facilitate the installation in a hole 10 drilled in concrete 11 or other type of masonry of a bolt B having a hexagonal head 12 and a cylindrical threaded shank 13 extending therefrom for fastening a fixture 14 or other object to the masonry.

Fixture 14 is provided with a mounting hole 15 which is aligned with masonry hole. Placed under head 12 of the bolt at its junction with shank 13 is a steel washer $W_1$ and a seal washer $W_2$ which may be formed of thin plastic material.

It will be seen that mounting hole 15 has a diameter somewhat greater than that of masonry hole 10. This makes it possible to first place fixture 14 on a desired site on masonry 11 and then drill hole 10 in the masonry through the mounting hole of the fixture.

The diameter of drilled hole 10 is greater than that of shank 13 to provide an annular space between the shank and the bank of the hole to accommodate an uncured and flowable chemical bonding agent 16 which in practice may be an epoxy resin. This resin is flowable in its uncured state and hardens when cured. The charge of flowable bonding agent deposited in drilled hole 10 is such as to initially occupy only the lower region of this hole. And the amount is such that when the shank is inserted in the hole and plunges into the bonding agent, the flowable agent then rises in the masonry hole into the annular space between the shank and the bank of the hole and through the mounting hole in the fixture. There is a sufficient charge of bonding agent deposited as to cause a limited overflow thereof out of the mounting hole in the fixture to indicate that the annular space between the shank and the bank of the masonry hole is fully occupied. Hence an excess deposit serves to indicate to the installer that the bolt is adequately anchored.

The assembly includes a cylindrical sleeve 17 whose outer diameter matches that of masonry hole 10 and whose inner diameter is greater than that of a bolt shank 13. When sleeve 17 is fitted into mounting hole 15 of the fixture, it is pressed or tapped into the upper end of masonry hole 10 so that it is snugly telescoped therein and cannot be displaced by the flowable bonding agent when it rises within the masonry hole. And the sleeve also shields the interface between the fixture and the masonry so that the agent cannot seep into this interface.

The upper end of sleeve 17 is provided with an annular flange 18 whose diameter is greater than that of mounting hole 15 so that the flange overlies the fixture and holds the sleeve in place. Sleeve 17 and its flange 18 may be molded of relatively stiff synthetic plastic material, such as polyethylene of polypropylene.

As best seen in the embodiment of the sleeve shown in FIG. 4, sleeve 17 is provided with centering means in the form of an array of longitudinally-extending ribs R. These project inwardly to engage shank 13 of the bolt inserted in the sleeve and thereby maintain the shank in coaxial alignment with the sleeve. The centered shank prevents it from leaning against the sleeve. The annular space between the shank and the inner wall of the sleeve 17 acts as an inner flow passage. Thus in practice, one lays down the flat ring on the fixture before applying the sleeve.

Also included in the assembly is an overflow member in the form of a flat ring 19, preferably die cut of flat sheet material, such as paper or a paper-like non-woven fabric. Ring 19 is placed on the surface of fixture 14 in registration with mounting hole 15, the flange 18 of sleeve 17 going through the mounting hole lying over the ring.

The ring material is tearable, and after the ring has accumulated an overflow of the bonding agent and the agent has hardened, the ring may be torn or broken off and discarded, leaving a clean fixture surface. Or the ring may be formed of thin plastic material that is easily cracked. The diameter of the flat ring is such as to provide an adequate surface for the anticipated excess bonding agent to be accumulated thereon, for it is important that no excess make contact with the fixture surface.

Ring 19 whose diameter is large relative to that of flange 18 of the sleeve, is seated on fixture 14, as shown in FIG. 1, in registration with its mounting hole 15. In practice, a hole is first drilled in the masonry through the mounting hole in the fixture with an ANSI drill to a depth appropriate to the length of the shank, but with a greater diameter. After the masonry hole is blown clean, ring 19 is seated on the fixture and centering sleeve 17 is then pressed through the fixture mounting hole into the masonry hole with its flange 18 overlying the ring so that the sleeve is snugly telescoped in the mounting hole in the fixture and the upper end of the drilled masonry hole. Sleeve 17 lines the upper end of the masonry hole so that no bonding agent 17 can flow between the bank of the drilled hole and the sleeve, but only through the flow passage within the sleeve.

Then a charge of an uncured, flowable bonding agent 16 is deposited in the drilled hole, after which the shank 13 of the bolt is inserted in the drilled hole through centering sleeve 17. The inserted shank causes the bonding agent in which it is plunged to rise in the drilled hole through the annular space between the shank and the bank of the drilled hole and the inner passage between the shank and the sleeve. The rising bonding agent overflows out of the flow passage in the sleeve through the fixture mounting hole 15 onto the surface of ring 19 where the overflow is collected.

The amount of the deposit must be such in relationship to the size of the drilled hole and that of the bolt shank inserted therein whereby the resulting overflow will all be collected on the ring and not spread beyond the ring onto the fixture surface. The amount of the deposit is predetermined and depends, of course, on the dimensions of the bolt shank to be installed and the size of the masonry hole.

After the collected overflow cures and hardens, it forms a rigid blob 20 on the flat ring. The ring having served its purpose, is now removed by means of a screwdriver whose blade is pushed under ring 19 to tear or break it off so that the blob adhered thereto can be discarded, leaving a clean fixture surface.

The centering means on the sleeve must be such as to support the inserted shank coaxially in the sleeve without however blocking the outflow of excess bonding agent from the sleeve. Instead of centering ribs, the sleeve may be provided with a relatively thick wall which engages the shank and is provided with an array of longitudinally extending flutes to define flow passages for the bonding agent.

Modifications

In some situations it is desirable that the centering sleeve not permit a flowable bonding agent to flow freely therethrough. Thus when a threaded shank is installed in a drilled hole in overhead masonry, the charge of flowable bonding agent deposited in the drilled hole, even when it is a viscous epoxy resin, because of gravity flow will gradually leak out of this vertical hole. Hence a sleeve having longitudinally-extending centering ribs, as in FIG. 4, will not even partially arrest such leakage. Leakage is not acceptable, for it will diminish the amount of agent in the annular space between the shank and the bank of the hole and result in inadequate anchoring of the stud.

A similar situation would arise when a threaded shank is to be installed in a vertical masonry wall, and the hole drilled in this wall then has a horizontal axis, as a result of which the bonding agent deposited in the hole seeks to leak out of the hole by reason of gravity flow.

In order to impede gravity flow from the drilled hole, sleeve 21 having a flange 22 at its upper end, as shown in FIG. 5, is provided with centering ribs $R_x$ and $R_y$ which are segments of a helix and serve therefore to intercept a flowable agent when as a result of gravity flow, the agent seeks to flow out of the drilled hole. Ribs $R_x$ and $R_y$ only retard or partially block outflow, and an excess bonding agent, as in FIG. 1, will be collected on the overflow ring.

In the sleeve 23 having a flange 24, as shown in FIG. 6, coplanar with flange 24 extending outwardly from the upper end of the sleeve is a disc 25 of resilient material integral with the sleeve. Disc 25 is provided with a center bore 26 whose diameter is smaller than that of the bolt shank to be inserted through the sleeve in the hole drilled in masonry, and an array of narrow slots 27 radiating from the bore to define five flexible flaps.

When the shank is inserted into the relatively small diameter bore, the flaps are then deflected to permit entry of the stud into the hole. The flaps which engage the shank act to center the shank in the hole.

The narrow slots 27 in disc 25 provide restricted flow passages for the flowable bonding agent deposited in the drilled masonry hole. These passages permit outflow of the bonding agent onto the overflow ring, as is necessary to indicate proper anchoring of the bolt. But these restricted flow passages function to retard outflow of the bonding agent as a result of gravity flow which takes place in overhead or vertical installations in masonry.

Thus a centering sleeve and ring assembly in accordance with the invention not only acts to center the anchor bolt and make possible a proper installation, but it also acts to obviate the need to wipe off excess agent from the fixture, a messy and time consuming operation. And the assembly also makes it possible to effect a proper bolt installation on overhead and vertical masonry without the loss of bonding agent as a result of gravity flow.

Instead of a circular paper ring to collect the excess bonding agent, one may use a square mat of paper or other tearable material for this purpose, the mat having a center opening aligned with the drilled hole. The overflow ring need not be made of tearable or breakable material, but can be fabricated of an elastomeric material, such as latex, then after the overflow bonding agent hardens thereon, it can be stretched to enlarge its opening so that the ring can be pulled off the bolt. Also instead of a flange at the upper end of the sleeve which overlies the overflow ring and acts to hold the ring in its proper position on the surface of the masonry, other means may be provided for the same purpose, such as an array of radial fingers which engage the ring to hold it in place. Or the sleeve may be provided at its upper end with a lip which engages the ring.

Tightening of Installation

In the Giannuzzi et al. application, above-identified, entitled CHEMICAL ANCHOR BOLT AND CAP ASSEMBLY there is disclosed an assembly in which a fixture is fastened to masonry by a bolt whose shank is chemically anchored in a hole drilled in the masonry, and in which the fastening can be tightened by turning the bolt so that its head presses against the fixture.

To this end, the threaded shank of the bolt is coated with a release agent. Coupled to the end of the bolt is a thin-walled hollow cap. When the bolt shank and cap coupled thereto are inserted through the mounting hole in the fixture into the hole drilled in the masonry in which is deposited a charge of a flowable bonding agent, such as an epoxy, and the epoxy then cures and solidifies, then formed in the hard epoxy is a female thread that matches the release-coated male thread of the shank, so that the bolt can be turned in the hard epoxy occupying the masonry hole.

The shape of the hollow cap coupled to the shank end is such that when the cap becomes embedded in the hard epoxy below the end of the shank in the masonry hole, a cavity is formed in the epoxy by the cap whose bank acts as a partial barrier to the advance of the shank when the bolt is turned. But to effect tightening, the bolt is turned in to cause the end of the shank to cut into the epoxy bank and thereby overcome the partial barrier.

The resultant frictional engagement between the end of the shank and the partial barrier resists turning out of the bolt and loosening of the fastening should the masonry in which the bolt is installed be subjected to external shock and vibratory forces seeking to do so.

In the bolt installation shown in FIG. 1, once epoxy 16 hardens in the drilled masonry hole 10, the shank of the bolt is chemically anchored therein and the bolt cannot be turned to press its head against the fixture to tighten the fastening.

In order therefore to make tightening possible in an installation in accordance with the invention in which the shank of the bolt is chemically anchored by epoxy in the masonry hole, in the embodiment illustrated in FIG. 7, coupled to the end of threaded shank 13 of the bolt which is coated by a release agent is a cap 27 whose shape and function correspond to those of the caps disclosed in the above-identified Giannuzzi et al. copending patent application.

In all other respects, the bolt installation shown in FIG. 7 is the same as that shown in FIG. 1 and includes a sleeve and overflow member assembly to collect overflow epoxy ejected from the mounting hole of the fixture.

When cap 27 is embedded in the hardened epoxy in the masonry hole below the end of the shank, it creates a partial barrier in the bank of the epoxy cavity formed by cap 27. When the bolt is turned to tighten the fastening this partial barrier is overcome by the advancing end of the threaded shank which cuts into the partial barrier. The advantage of this arrangement is that it not only permits tightening of the fastening, but it also prevents unloosing of the tightened fastening as a result of external shock and vibratory forces to which the masonry is subjected.

It is also possible, as shown in the above-identified Kellison patent, to create a void in the epoxy in the masonry hole below the end of the shank to permit the shank to freely advance to effect tightening of the fastening. But the void would not resist forces which seek to loosen the fastening.

It is important to note that in a bolt installation, the sleeve included in an assembly in accordance with the invention need not be provided with centering means to maintain the inserted shank coaxial with the sleeve and with the bank of the masonry hole below the sleeve.

The reason one may dispense with these centering means is that in a bolt installation the shank is inserted into the drilled masonry through the mounting hole in the fixture resting on the masonry surface, the head of the bolt then overlying the fixture. Since the mounting hole in the fixture has a diameter that matches the diameter of the hole drilled in the masonry or is slightly larger, the mounting hole in the fixture maintains the shank of the bolt inserted therein at an upright position so that it is not tilted with respect to the masonry hole.

In a stud installation, as disclosed in our above-identified copending application, the stud is inserted directly into the masonry hole and is chemically anchored therein before a fixture having a mounting hole is placed on the masonry. Hence to prevent the stud from tilting in the masonry hole and becoming chemically anchored in this hole in a tilted state, the sleeve must be provided with centering means to maintain the stud in an upright position.

However, while a sleeve intended for a bolt installation need not be provided with centering means, such means are nevertheless desirable, for they serve to maintain the shank not only in an upright position, but also coaxial with the sleeve and the masonry hole. And the centering means also retard gravity flow of the flowable bonding agent from a hole drilled in overhead or vertical masonry.

While there has been shown and described preferred embodiments of a centering sleeve and overflow member assembly for a masonry installation in accordance with the invention, it will be appreciated that many changes may be made thereon within the spirit of the invention.

We claim:

1. A sleeve and overflow member assembly to facilitate installation in a hole drilled in masonry of a bolt having a head from which extends a shank whose diameter is smaller than that of the masonry hole to fasten to the masonry a fixture having a mounting hole whose diameter is at least as great as that of the masonry hole, the shank being insertable through the mounting hole into the masonry hole in which is deposited a charge of a flowable uncured bonding agent, the head of the bolt then being adjacent the fixture; said assembly comprising:

A. a member adapted to be placed on the fixture having an opening therein in registration with the fixture mounting hole; and B. a sleeve adapted to fit into the fixture mounting hole to telescope into and engage the upper end of the masonry hole to define when the shank of smaller diameter is inserted, an inner passage between the shank and the sleeve and a space between the shank and the bank of the masonry hole below the sleeve, whereby when the shank is inserted it plunges into the deposit to cause the flowable agent to rise through the space and then through the inner passage to overflow onto the member and to be collected thereby so that when the agent is cured and solidified, the shank is then chemically anchored in the masonry hole and the solidified overflow on the member can be discarded to provide a clean fixture surface.

2. An assembly as set forth in claim 1, in which the sleeve is provided with centering means to maintain the shank inserted therein coaxial with the sleeve and the bank of the masonry hole below the sleeve to define said passage and said space.

3. An assembly as set forth in claim 1, in which the sleeve is provided with means to hold it in place.

4. An assembly as set forth in claim 3, in which the means is a flange extending outwardly from the upper end of the sleeve.

5. An assembly as set forth in claim 1, in which the sleeve is formed of synthetic plastic material.

6. An assembly as set forth in claim 1, in which the member is a flat ring.

7. An assembly as set forth in claim 6, in which the flat ring is formed of paper.

8. An assembly as set forth in claim 6, in which the flat ring is formed of stretchable material.

9. An assembly as set forth in claim 2, in which the sleeve is cylindrical and the centering means is adapted to engage the shank inserted in the sleeve.

10. An assembly as set forth in claim 9, in which the centering means is formed by an array of ribs extending along the length of the sleeve.

11. An assembly as set forth in claim 9, in which the centering means include means to retard gravity flow of the flowable agent from the sleeve.

12. As assembly as set forth in claim 11, in which said means to retard gravity flow are formed by segments of a helix.

13. An assembly as set forth in claim 11, in which the means to retard flow is formed by a disc at the end of the sleeve having a center bore therein adapted to receive the shank and slots radiating from the bore to define flexible flaps that engage the shank.

14. An assembly as set forth in claim 1, in which the shank of the bolt is threaded and is coated with a release agent, further including a cap coupled to the end of the shank whereby when the bonding agent is solidified, then formed therein is a female thread which matches the release-coated thread of the shank to permit the bolt to be turned to advance into the cap to effect tightening of the installation.

15. An assembly as set forth in claim 14, in which the cap has a shape which when the cap is embedded in the solidified bonding agent it then creates a partial barrier to the advance which is overcome by the advancing shank which cuts into the barrier.

* * * * *